(12) United States Patent
Yin et al.

(10) Patent No.: US 8,077,704 B2
(45) Date of Patent: Dec. 13, 2011

(54) WEB SERVICE ASSISTED REAL-TIME SESSION PEERING BETWEEN ENTERPRISE VOIP NETWORKS VIA INTERNET

(75) Inventors: Aihao Yin, Qingdao (CN); Yifei Lin, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 335 days.

(21) Appl. No.: 12/349,407

(22) Filed: Jan. 6, 2009

(65) Prior Publication Data

US 2010/0172344 A1 Jul. 8, 2010

(51) Int. Cl.
H04L 12/66 (2006.01)
(52) U.S. Cl. .................... 370/352; 379/210.01; 709/224
(58) Field of Classification Search .................. None
See application file for complete search history.

(56) References Cited

U.S. PATENT DOCUMENTS

| | | | |
|---|---|---|---|
| 6,798,771 B1 * | 9/2004 | Low et al. ...................... 370/353 |
| 7,042,880 B1 * | 5/2006 | Voit et al. ..................... 370/395.1 |
| 7,068,669 B2 * | 6/2006 | Abrol et al. ..................... 370/401 |
| 7,076,393 B2 * | 7/2006 | Ormazabal et al. ........... 702/122 |
| 7,283,519 B2 * | 10/2007 | Girard ............................. 370/353 |
| 7,313,145 B1 * | 12/2007 | Bradd et al. ................... 370/401 |
| 7,359,967 B1 * | 4/2008 | Synnestvedt et al. ......... 709/224 |
| 7,649,881 B2 * | 1/2010 | Casey ............................. 370/389 |
| 7,877,444 B2 * | 1/2011 | Moran et al. ................... 709/205 |
| 2002/0091794 A1 * | 7/2002 | Moran et al. ................... 709/218 |
| 2002/0176404 A1 * | 11/2002 | Girard ............................. 370/352 |
| 2004/0120505 A1 * | 6/2004 | Kotzin et al. ............. 379/373.01 |
| 2004/0128554 A1 * | 7/2004 | Maher et al. ................... 713/201 |
| 2006/0146792 A1 * | 7/2006 | Ramachandran et al. ..... 370/352 |
| 2006/0239255 A1 * | 10/2006 | Ramachandran et al. ..... 370/352 |
| 2006/0291450 A1 * | 12/2006 | Ramachandran et al. ..... 370/352 |
| 2007/0019563 A1 * | 1/2007 | Ramachandran et al. ..... 370/252 |
| 2007/0250702 A1 * | 10/2007 | Kirchhoff ....................... 713/151 |
| 2007/0276947 A1 * | 11/2007 | Panattu et al. ................. 709/227 |
| 2008/0139186 A1 * | 6/2008 | Ringland et al. ............... 455/415 |
| 2008/0144796 A1 * | 6/2008 | Ringland et al. ......... 379/210.01 |
| 2008/0162709 A1 * | 7/2008 | Hrischuk et al. .............. 709/230 |
| 2008/0165782 A1 * | 7/2008 | Vizaei ............................. 370/392 |
| 2008/0232351 A1 * | 9/2008 | Takahashi et al. ............. 370/352 |
| 2008/0249782 A1 * | 10/2008 | Ativanichayaphong et al. ............................... 704/275 |
| 2009/0005048 A1 * | 1/2009 | Bae et al. ........................ 455/439 |
| 2009/0083845 A1 * | 3/2009 | Ormazabal et al. ............. 726/11 |
| 2009/0116627 A1 * | 5/2009 | Ropolyi .................... 379/114.03 |
| 2009/0279537 A1 * | 11/2009 | Strickland et al. ............. 370/352 |
| 2009/0309764 A1 * | 12/2009 | Croak et al. ................. 340/995.2 |

* cited by examiner

Primary Examiner — Ayaz Sheikh
Assistant Examiner — Faiyazkhan Ghafoerkhan
(74) Attorney, Agent, or Firm — Fliesler Meyer LLP

(57) ABSTRACT

A system and method enables Voice over IP (VoIP) session peering via Internet. A converged enterprise web server can receive a request from a caller to initiate a session, associate a Service Level Agreement (SLA) and address information of the caller with the request, and then provide the request to a receiver using a first communication protocol. After accepting from the receiver a response to the request if the caller is an allowed partner of the receiver based on the SLA, wherein the response is associated with address information of the receiver, the converged enterprise web server can establish the session between the caller and the receiver using a second communication protocol.

16 Claims, 1 Drawing Sheet

WEB SERVICE ASSISTED REAL-TIME SESSION PEERING BETWEEN ENTERPRISE VOIP NETWORKS VIA INTERNET

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention generally relates to real-time session peering between enterprise Voice over IP (VoIP) networks.

BACKGROUND

The Session Initiation Protocol (SIP) was initially designed to enable Internet users with personal computers or endpoints to set up real-time sessions that exchange voice, video, and/or data for free. However, the usage of SIP so far has been limited within closed IP networks, such as commercial carrier's IP Multimedia Subsystem (IMS), or Next Generation Networks (NGN), or enterprise Voice over IP (VoIP) networks. In addition, calls between enterprise SIP-based VoIP networks are infeasible, since a centralized Internet-wide SIP routing scheme is difficult to implement and maintain.

SUMMARY

In one embodiment, a Web Service, WS-SessionPeering is defined to assist real-time enterprise session peering, while leveraging existing enterprise address resources such as domain name, Hypertext Transfer Protocol (HTTP) Uniform Resource Locators (URLs), emails addresses and/or SIP URLs. Different from previously SIP-enabled end-to-end routing, enterprises can use a Web Service to facilitate the peering handshake prior to session setup. Peering networks can use WS-SessionPeering to facilitate routing, mutual authentication, Service Level Agreement (SLA) control, and exchanging of information necessary for ensuring real-time session establishment. Instead of relying on SIP routing schemes on the Internet, existing enterprise addressing such as enterprise HTTP URL with domain name can be used to reach directly to peer networks.

DETAILED DESCRIPTION

Figure 1:
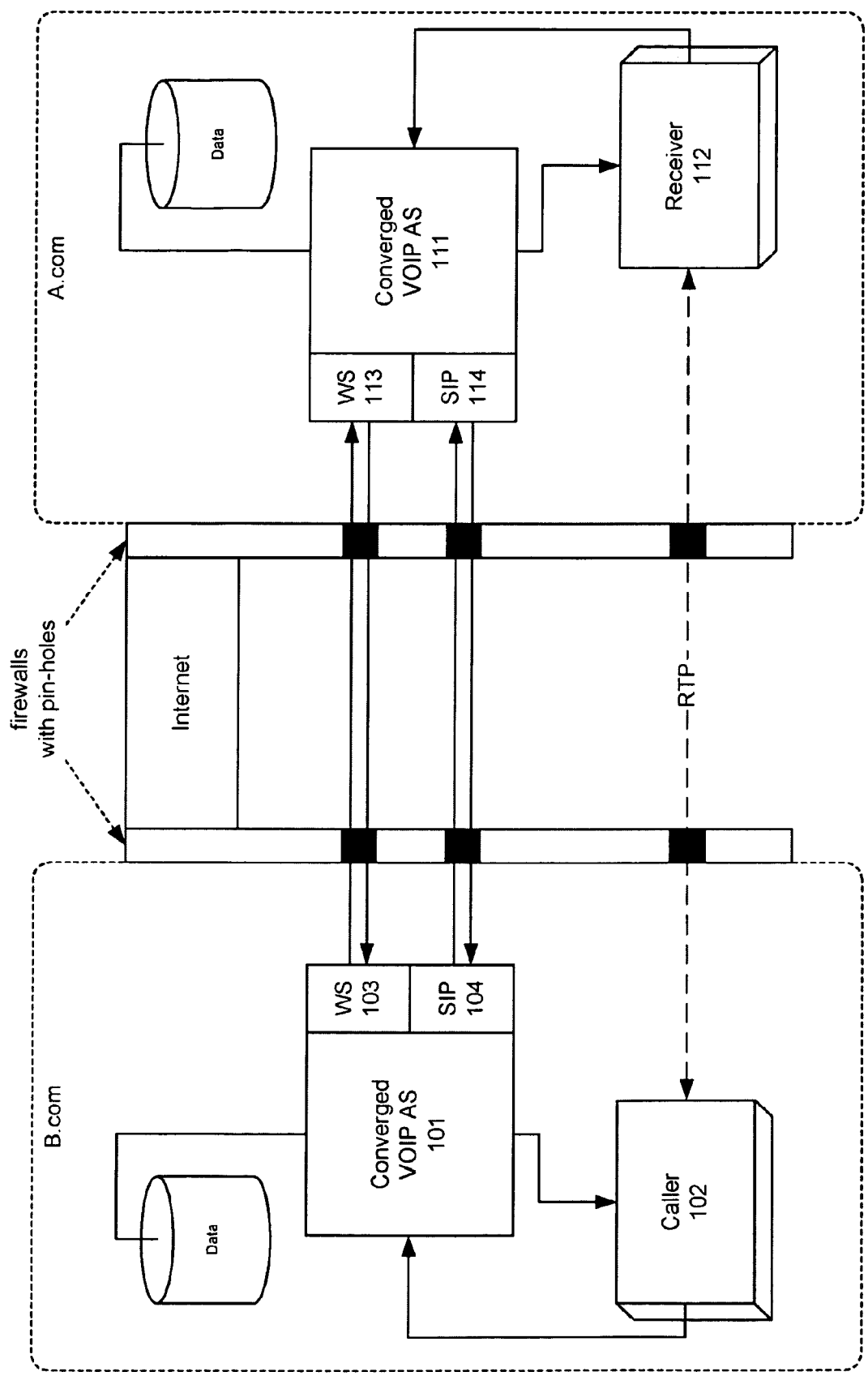
FIG. 1 is an exemplary illustration of VoIP session peering via Internet between two enterprise VoIP networks, in accordance with an embodiment.

Closed IP networks use private IP addresses and deploy Network Address Translation/Port Address Translation (NAT/PAT) firewalls. The NAT/PAT firewalls perform private and public IP address mapping for SIP and Real-time Protocol (RTP) so that the session control and media packets traverse cross network boundaries. Almost all of these closed IP networks are isolated topology-hiding private networks. It is difficult to maintain a large global-reachable scheme for SIP routing throughout the whole Internet. In addition, there is no neutral organization that can provide support for all of those telecom carriers and isolated enterprise networks, even though the DNS-based Telephone Number Mapping (ENUM) servers can resolve the E.164 format URLs into domain name or exact IP address. As referred to herein, E.164 format is an international numbering plan for public telephone systems in which each assigned number contains a country code (CC).

Telecom carriers establish a limited number of direct network connections with others by deploying dedicated network gateways at the boundary and each has to configure static SIP routing scheme respectively. Hence, the connections among the carriers are limited to a finite number. Also, enterprises VoIP networks have to pay to carriers for making external call through traditional public switched telephone network (PSTN), public land mobile network (PLMN) or NGN/IMS, even though two enterprises each with own VoIP network and high speed Internet access cannot directly peer with each other.

Pure SIP-based enterprises VoIP peering needs a centralized third-party routing server to enable an enterprise VoIP SIP server to randomly add and maintain a new SIP route entry to a randomly new partner enterprise. However, such a centralized third-party routing server does not exist, or is difficult to maintain. Furthermore, there are limit resource of static IP addresses, available to support for every possible enterprise VoIP exposure. Also, the enterprise IP address usage tends to change over time and make it difficult for all other peering networks to refresh the routing data in a timely manner.

Some enterprises use Internet Service Providers (ISP) such as Skype to save phone cost. However, they have to initiate calls from PCs using a non-E.164 identity, e.g. Skype ID, and the calls to public telephone numbers (possibly in enterprise VoIP network) are charged. The additional ISP IDs adds to the complexity of existing commercial process. Although the non-voice communication means like instant messaging or emails via Internet are adopted for zero cost to assist business, most companies are still relying on public telecom carrier for real-time voice/video communication.

Furthermore, peer-to-peer (P2P) technology in SIP does not support non-centralized SIP routing. In addition, to support P2P SIP, the closed enterprise VoIP networks need to publish and open itself to the Internet with static addressing so that they can be contacted by other peers. This brings security concerns to today's closed-but-safe VoIP networks. Especially, the network is vulnerable to security threats when exposing its static addresses to Internet.

In one embodiment, a new Web Service, WS-SessionPeering is defined to assist realtime enterprise session peering, while leveraging existing enterprise address resources such as domain name, HTTP Uniform Resource Locators (URLs), emails addresses and/or SIP URLs. Different from previously SIP-enabled end-to-end routing, enterprises can use a Web Service to facilitate the peering handshake prior to session setup. Peering networks can use WS-SessionPeering to facilitate routing, mutual authentication, Service Level Agreement (SLA) control, and exchanging of information necessary for ensuring real-time session establishment. Instead of relying on SIP routing schemes on the Internet, existing enterprise addressing like enterprise HTTP URL with domain name can be used to reach directly to peer networks.

For example, the originating user, or caller, can click-to, or dial, the business identity such as email address of a destination or receiver, instead of having to remember to dial the receiver's business phone number/extension or the ISP IDs such as Skype. A user's business email address can be used for session destination, instead of the E.164 phone number, in order to avoid introducing a new addressing scheme.

In one embodiment, a Web Service is used to assist VoIP Peering between any enterprise networks while leverage existing enterprise Internet addressing scheme and resources, such as domain name, HTTP URL, and email. There is no need to open static VoIP network addresses (for SIP/RTP) to the Internet. This semi-closed VoIP network exposure approach can dynamically allocate resource upon request. This approach does not rely on carrier's walled-garden IP networks and telephone numbering schemes, saving cost and making more business sense. In addition, this approach provides easy integration with enterprise service-oriented architecture (SOA) application infrastructure, at the web service layer rather than SIP, and enables close relationship to business partners.

In one embodiment, instead of opening static always-on SIP/RTP addresses to public internet, the method employs a secure procedure to open dynamic connections for enterprise VoIP peering. For a new peering session via Internet, the enterprise VoIP NAT/PAT firewall temporarily opens pin-holes for SIP that does session control, and for RTP that bears real-time media packets. Then, the enterprise VoIP NAT/PAT firewall closes the pin-holes right after session ends, thus making these networks semi-closed and more secure.

Compared to the Public Switched Telephone Network (PSTN) or carrier VoIP enabled calls, VoIP session peering via Internet is more cost effective. VoIP session peering via Internet can perform authentication and SLA control between peering enterprises, instead of at SIP level. In addition, any enterprise networks via Internet are reachable, there is no need to pre-define SIP routing schemes and static public addresses. VoIP session peering via Internet also provides a cost-effective way of adapting to existing company network, reusing company resources such as web server, VoIP application server, and NAP/PAT firewall. Furthermore, VoIP session peering via Internet can reuse company URL and users email address to do VoIP peering. There is no additional addressing, and no longer heavily relying upon carrier owned E.164 phone numbers and routing schemes. VoIP session peering via Internet provides easy integration into a company SOA infrastructure to facilitate better interoperability between real-time communication applications and enterprise business applications. VoIP session peering via Internet also provides better security by using semi-closed network approach compared to the static network exposure to Internet. VoIP session peering via Internet also provides more flexible and extensible way to separate peering procedure from underlying SIP procedure. In summary, VoIP session peering via Internet provides better support dynamic business partnerships between businesses.

In one embodiment, WS-SessionPeering is defined for VoIP peering with public available Web Services Description Language (WSDL) definition, so that all enterprise web servers understand each other using this web service. A default HTTP URL pattern can be defined for accessing the web service, such as http://www.enterpise_domain_name.com/SessionPeering. The enterprise web server, which can support the WS-SessionPeering Web Service and related procedures, may co-exist with the VoIP SIP application server within a converged container.

In one embodiment, WS-SessionPeering can be accessed via a public HTTP URL address and interact with enterprise resources.

FIG. 1 is an exemplary illustration of VoIP session peering via Internet between two enterprise VoIP networks. As shown in FIG. 1, a caller 102 can use WS-SessionPeering to interact with a receiver 112 through peer enterprise Web Server to mutually authenticate each other, enforce Service Level Agreement (SLA) and exchange address information necessary for establishing session peering. The enterprise Web Server 103 or 113 can interact with enterprise directory server (Lightweight Directory Access Protocol (LDAP), exchange, etc.) to resolve the users identity to mapping convert the destined employee's business address (such as email) to a VoIP phone number, so that the receiver 112 can be reached via VoIP calls.

The enterprise Web Server 103 or 113 can instruct the VoIP SIP server 104 or 114 to interact with NAT/PAT firewalls to temporarily open pin-holes for incoming/outgoing peering session upon call setup. Here, a pin-hole describes a port that is opened through a firewall to allow a particular application to gain controlled access to the protected network. For incoming calls routed from the NAT/PAT firewall's pin-hole allocated, the enterprise Web Server 113 can instruct the VoIP SIP server 114 to temporarily accept it according to SLA; For outgoing call requests accepted by peering Web Server, the enterprise Web Server 103 can instruct the VoIP SIP Server 104 to route call out to peering NAT/PAT firewall's pin-hole's public address through own NAT/PAT firewall pin-hole.

The SIP Application server can interact with the web server and NAT/PAT firewall for various functions. For example, a SIP Uniform Resource Identifier (URI) parameter can be defined as sip:employe_id@enterpirse_domain.com?peer.

If a different HTTP URL for accessing the WS-SessionPeering is used (e.g. hosted VoIP), it can appear as a parameter in SIP URI:

sip:employe_id@enterprise_domain.com?peer;url=http://hosting_domain_name/SessionPeering The SIP Application Server recognizes the session peering request available in above SIP URI and then initiate request to the Web Server for peering request, instead of applying normal routing to carrier's network.

In an example scenario, as shown in FIG. 1, Henry at A company (henry@A.com) got to know Bob at B company (bob@B.com) via a business project, where they exchanged name cards. Henry's telephone address not only has regular E.164 phone numbers, but also his public VoIP phone address that is peering callable: sip:henry@A.com?peer. Bob also has a public VoIP phone address that is peering callable: sip:bob@B.com?peer.

The following is an exemplary peering procedure, in accordance with one embodiment of the present invention.

The caller 102, Bob, would like to contact with the receiver 112, Henry, so he inputs sip:henry@hp.com?peer on his SIP desk phone and pressed the dial button.

B company's SIP VoIP application server 104, which can be a part of a B company's converged VoIP Application Server 101, recognizes this is a VoIP peering call, so it directly the NAT/Pat firewall to open pin-holes for Internet connection.

B company's SIP VoIP application server 104 reports the pin-hole addresses and receiving address sip:henry@A.com?peer to the Web Server at http://www.B-.com/SessionPeering and requests to make a Internet peering call.

B company's Session Peering Web Server 103 contacts A company's Session Peering Web Server at http://www.hp.com/SessionPeering via sending WS-SessionPeering request with above information provided.

A company's Web Server 113 does SLA check to see whether B company is an allowed partner according to provisioned company SLA policy. If yes, it directs the request to A company's VoIP SIP application server 114.

A company's SIP Application server 114 instructs the NAT/PAT firewall to allocate temporary pin-holes for public access to Internet and report to Web Server.

A company's Web Server 113 responds to B company's Web Server 103 with own pin-hole public address information.

B company's Web Server 103 asks the SIP application to route the call to A company's destination NAT/PAT server's public address, through B company's NAT/PAT Server's pin-holes.

A company's SIP server 114 recognizes the incoming call and resolves the email address, mapping it to Henry's desk SIP phone.

Henry's desktop phone rings and Henry answers the call.

Upon end of the call, the NAT/PAT firewall closes the pin-hole and SIP server notifies Web Server of session ending in both networks.

According to the information collected, each Web Server may record something like "B company Bob calls A company Henry at 10:30 AM for 5:50" for necessary business tracking needs.

In one embodiment, the address with peering indication can actually be exchanged in electronic format, such as a .vcf format (a file format standard for electronic business cards), and can be click-to-dialed directly. In the above example, the SIP URI can also be clicked on the webpage or Outlook address book, if the enterprise VoIP solution supports click-to-dial. The Web Server and SIP application server can be integrated on converged VoIP Server. In addition, internal interfaces, such as the interface between SIP and Web Server, and the interface between SIP Server and NAT/PAT firewall, can be defined to assist the VoIP session peering via Internet.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for providing real-time session peering, comprising:
receiving a request from a caller, at a first application server that is associated with the caller, to initiate a real-time session with a receiver;
directing a first firewall associated with the caller to open and reserve a first set of pin-holes for a real-time communication protocol for communicating with the receiver;
associating with the request a service level agreement (SLA) and address information for the first set of pin-holes on the first firewall which is associated with the caller;
providing the request to a second application server that is associated with the receiver using a web service protocol;
accepting from the receiver a response to the request if the caller is an allowed partner of the receiver based on the SLA, wherein the response is associated with address information for a second set of pin-holes on a second firewall which is associated with the receiver; and
establishing the real-time session between the caller and the receiver using the real-time communication protocol through the first set of pin-holes on the first firewall and the second set of pin-holes on the second firewall.

2. The method according to claim 1, further comprising:
closing the first set of set of pin-holes on the first firewall and the second set of set of pin-holes on the second firewall when the real-time session is ended.

3. The method according to claim 1, further comprising:
allowing the web service protocol to use Hypertext Transfer Protocol (HTTP).

4. The method according to claim 1, further comprising:
allowing the real-time communication protocol to enable internet users with general-purposed computers or endpoints to setup real-time sessions that exchange voice, video, and/or data.

5. The method according to claim 1, further comprising:
allowing the real-time session between the caller and the receiver to use a Real-time Protocol (RTP) that allows media packets to cross network boundaries.

6. The method according to claim 1, further comprising:
interacting with an enterprise directory server to resolve the receiver's identity and converting a receiver's business address to a Voice over Internet Protocol (VoIP) phone number, so that the receiver can be reached via VoIP calls.

7. The method according to claim 1, further comprising:
allowing the receiver to have an address with peering indication in electronic format, and can be click-to-dialed directly.

8. The method according to claim 1, wherein:
associating the web service protocol with a web service that does not need to open static network address.

9. A non-transitory machine readable medium having instructions stored thereon that when executed by one or more microprocessors cause a system to:
receive a request from a caller, at a first application server that is associated with the caller, to initiate a real-time session with a receiver;
direct a first firewall associated with the caller to open and reserve a first set of pin-holes for a real-time communication protocol for communicating with the receiver;

associate with the request a service level agreement (SLA) and address information for the first set of pin-holes on the first firewall which is associated with the caller;

provide the request to a second application server that is associated with the receiver using a web service protocol;

accept from the receiver a response to the request if the caller is an allowed partner of the receiver based on the SLA, wherein the response is associated with address information for a second set of pin-holes on a second firewall which is associated with the receiver; and establish the real-time session between the caller and the receiver using the real-time communication protocol through the first set of pin-holes on the first firewall and the second set of pin-holes on the second firewall.

10. The machine readable medium according to claim 9, further having instructions stored thereon that when executed cause a system to:

close the first set of set of pin-holes on the first firewall and the second set of set of pin-holes on the second firewall when the real-time session is ended.

11. The machine readable medium according to claim 9, wherein:

the web service protocol to use Hypertext Transfer Protocol (HTTP).

12. The machine readable medium according to claim 9, wherein:

the real-time communication protocol to enable internet users with general-purposed computers or endpoints to setup real-time sessions that exchange voice, video, and/or data.

13. The machine readable medium according to claim 9, wherein:

the real-time session between the caller and the receiver also uses a Real-time Protocol (RTP) that allows media packets to cross network boundaries.

14. The machine readable medium according to claim 9, further having instructions stored thereon that when executed cause a system to:

interact with an enterprise directory server to resolve the receiver's identity and converting a receiver's business address to a VoIP phone number, so that the receiver can be reached via VoIP calls.

15. The machine readable medium according to claim 9, wherein:

the receiver has an address with peering indication in electronic format, and can be click-to-dialed directly.

16. A system for providing real-time session peering, comprising:

a first application server to receive a request from a caller to initiate a real-time session with a receiver;

direct a first firewall associated with the caller to open and reserve a first set of pin-holes for a real-time communication protocol for communicating with the receiver;

associate with the request a service level agreement (SLA) and address information for the first set of pin-holes on the first firewall which is associated with the caller; and provide the request to a receiver using a web service protocol; and a second application server to receive the request from the first application server;

direct a second firewall associated with the receiver to open and reserve a second set of pin-holes for the real-time communication protocol for communicating with the caller;

send a response to the request if the caller is an allowed partner of the receiver based on the SLA, wherein the response is associated with address information for the second set of pin-holes on the second firewall which is associated with the receiver, and wherein the first application server and the second application server further operate to establish the real-time session between the caller and the receiver using a second communication protocol through the first set of pin-holes on the first firewall and the second set of pin-holes on the second firewall.

\* \* \* \* \*

UNITED STATES PATENT AND TRADEMARK OFFICE
CERTIFICATE OF CORRECTION

PATENT NO. : 8,077,704 B2
APPLICATION NO. : 12/349407
DATED : December 13, 2011
INVENTOR(S) : Yin et al.

Page 1 of 1

It is certified that error appears in the above-identified patent and that said Letters Patent is hereby corrected as shown below:

In column 3, line 58, delete "enterpise" and insert -- enterprise --, therefor.

In column 4, line 29, delete "id@enterpirse" and insert -- id@enterprise --, therefor.

In column 6, line 31, in Claim 2, after "set of" delete "set of". (second occurrence)

In column 6, line 32, in Claim 2, after "set of" delete "set of". (second occurrence)

In column 7, line 20, in Claim 10, after "set of" delete "set of". (second occurrence)

In column 7, line 21, in Claim 10, after "set of" delete "set of". (second occurrence)

Signed and Sealed this
Thirteenth Day of March, 2012

David J. Kappos
*Director of the United States Patent and Trademark Office*